April 29, 1969 G. FROMMEL 3,441,450

THERMOELECTRIC GENERATOR INCLUDING A PILOT BURNER

Filed April 27, 1964

INVENTOR

GERHARD FROMMEL

BY Alan M. Staubly

ATTORNEY

United States Patent Office 3,441,450
Patented Apr. 29, 1969

3,441,450
THERMOELECTRIC GENERATOR INCLUDING A PILOT BURNER

Gerhard Frommel, Torrance, Calif., assignor to Honeywell Inc., a corporation of Delaware Filed Apr. 27, 1964, Ser. No. 362,795
Int. Cl. H01v 1/00
U.S. Cl. 136—217 3 Claims

ABSTRACT OF THE DISCLOSURE

A thermoelectric generator of the type used to ignite a main burner and to control a safety valve, wherein a thermocouple is held in its supporting bracket by a quick connect and disconnect holding means. The holding means includes a conventional transom type of holding arm in combination with a resilient arm that does not so function but provides a firm operation of the conventional arm and a releasing aid for the arm.

This invention relates to thermoelectric generators and, more particularly, to a thermoelectric generator having a thermocouple unit of a particular design to cooperate with a holding means for permitting easy insertion of the thermocouple unit into the bracket of the generator and holding it there, without further manipulation of the holding means, but permitting movement of a portion thereof to free the unit for removal from the bracket. In addition to the overall shape of the thermocouple unit, it embodies a particular arrangement of insulation and sealing means that makes the unit highly efficient and substantial in construction.

It is a constant aim of the gas appliance controls industry to improve generators of the above mentioned type, both from the standpoint of reliability and cost and from the standpoint of ease with which the components of the generator may be assembled. Generators of this type are frequently positioned in very inaccessible places in a heating installation, which makes it highly desirable that they do not need frequent servicing and, in the event that they do need servicing, it can be rendered easily.

One object of this invention is to provide a thermoelectric generator which satisfies the above-mentioned requirements.

Another object of the invention is to provide a thermocouple unit of such a construction that the cost thereof is relatively low, yet has a construction which provides a long life therefor as compared to a number of similar commercial units.

Another object of the invention is to provide a quick connection and disconnection holding means for a thermocouple unit of a certain construction that enables a unit to be freely inserted and automatically held but being manually manipulatable by a simple movement to free the unit for removal.

A still further object of the invention is to provide a simple resilient latching means mounted on a bracket of a thermoelectric generator, which yieldably receives a thermocouple unit in the bracket, and having a latching element that prevents reverse movement of the unit, along with a resilient means for biasing the unit the reverse direction to firmly set the latching means on the unit.

Referring to the drawing, FIGURE 1 illustrates the invention in side elevation with portions thereof broken away;

Figures 1, 2, 3, 4, 5:
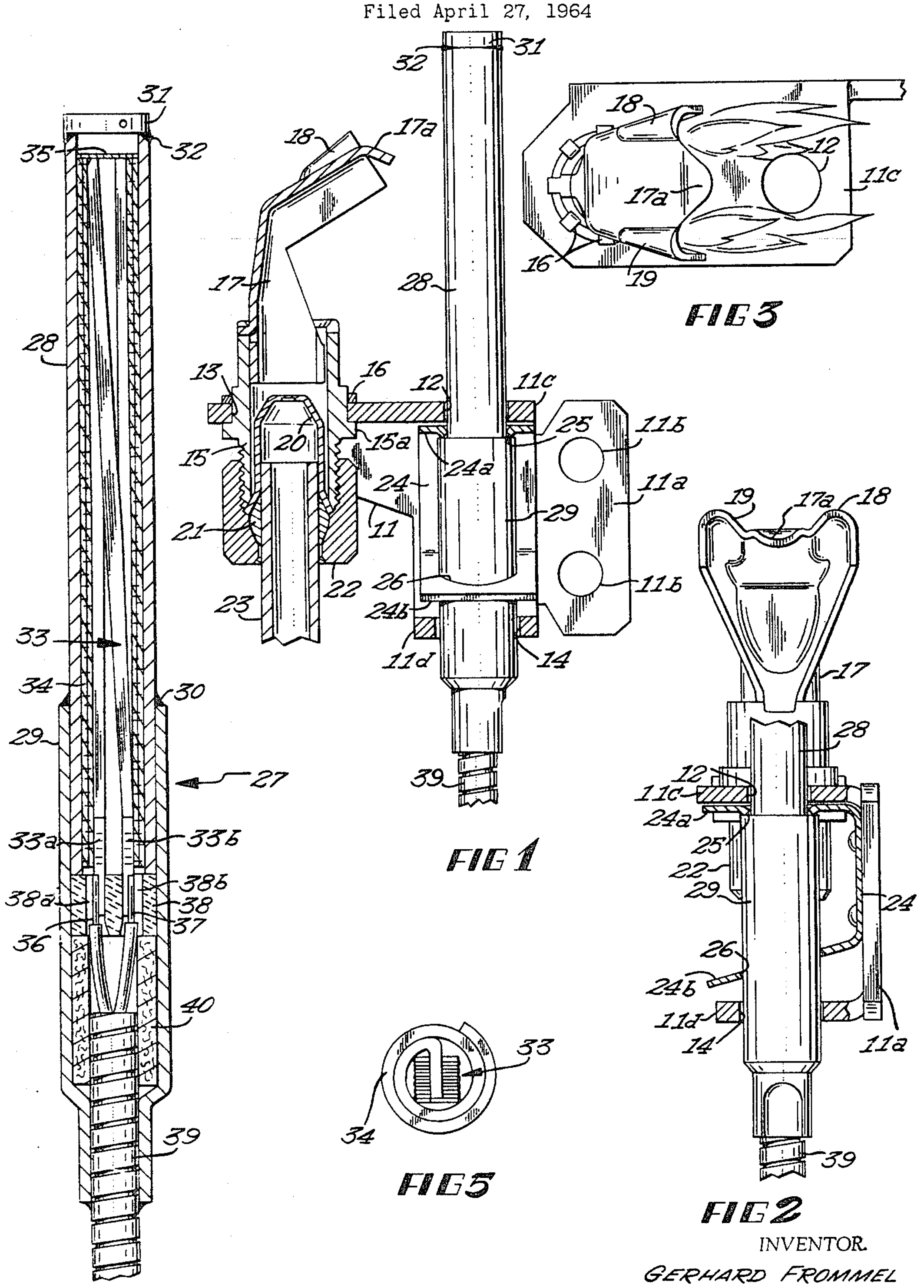
FIGURE 2 is an inner view of the invention with portions thereof broken away.
FIGURE 3 is a plane view of the invention showing a flame pattern generated by the pilot burner from any part of the invention.
FIGURE 4 is a longitudinal cross-sectional view of the thermocouple unit.
FIGURE 5 is an inner view of the thermocouple unit in the form of a thermopile with the insulation means thereof wrapped around the thermocouple elements.

Referring to FIGURE 1 of the drawing, the thermoelectric generator includes a bracket 11 having an end portion 11*a* with mounting holes 11*b* therein for the reception of bolts to secure the bracket to a main burner. The bracket has a transversely extending arm 11*c* with an aperture 12 at one end thereof and aperture 13 at the other end thereof. The bracket also has an arm 11*d* spaced from the arm 11*c* and has an aperture 14 therein which is of larger diameter than the aperture 12, but co-axial therewith.

Mounted in the aperture 13 is a pilot burner body 15 that has an annular shoulder 15*a* intermediate its ends that engages the under surface of the arm 11*c* and cooperates with a retaining ring 16 tightly surrounding the burner body and bearing against the upper surface of the arm 11*c* to hold the pilot burner body in assembled relationship with the bracket. Positioned in the upper end of the burner body is a target type of flame deflector 17 having channel portions 18 and 19 therein which cooperate with an oppositely extending flame divider 17*a* to direct two flame portions over and around the axis of the apertures 12 and 14. The lower end of the burner body has a cup-shaped orifice member or spud 20 therein which is clamped at its lower end to the burner body by means of a compression sleeve 21 and a ring nut 22 screwed onto the burner body that clamps the sleeve against the spud 20 and the spud against the burner body. The ring nut and compression sleeve clamp a gas supply tube 23 in a gas tight manner.

Screwed to the bracket 11 is a generally U-shaped holding or latching means having a base portion and a pair of arms of spring metal 24. One arm 24*a* of the latching means extends substantially at right angles to the base of the latching means while the other arm 24*b* extends at an obtuse angle with respect to the base and in diversion relationship with respect to the other arm. Arm 24*a* is normally spaced slightly from the arm 11*c* of the bracket and has an aperture 25 therethrough which is of a diameter substantially the same as the aperture 12. If desired, the arm material surrounding the aperture 25 may be deformed slightly in the direction of the arm 24*b* to give a line contact with a flat surface abutting that surface. The arm 24*b* has an aperture 26 which is of substantially the same diameter as the aperture 14 or even slightly larger.

A thermocouple unit, generally designated by the reference numeral 27 includes a metal sleeve made of a certain steel material generally known as "Kanthal" which extends partially into one end of copper sleeve 29 and silver soldered thereto at 30. The upper end of the sleeve 28 is closed by a Kanthal plug 31 resistance welded to the sleeve 28 at 32. A plurality of series connected thermocouple elements, generally designated by the reference numeral 33, consisting of alternately connected Chromel-Copel strips of metal, are positioned within sleeve 28 with a sheet of "Burnil" brand of paper 34 as insulation material wrapped around the thermocouple elements and bearing against the inner surface of the sleeve 28. This sheet may be of a single layer or a double layer, as illustrated in the drawing. This "Burnil" paper is a completely inorganic synthetic mica of the general formula $XMg_2LiSi_4O_{10}F_2$ (where X is Li or Na) and the type number CM–2 or of the same type of material having formula $XMg_2LiSi_4O_{10}F_2$ (where X is Li or Na). A disc 35 of this material is also positioned between the ends of the thermocouple elements and the plug 31. The end elements of the thermopile have lead extensions 33*a* and 33*b* which are connected to lead wires 36 and 37 within openings 38*a* and 38*b* of a ceramic disc 38 abutting against the inner end of the sleeve 28 and the inner surface of the sleeve 29. The lead wires and their armored cable 39 are surrounded by a refractory-fiber insulation 40, predominantly alumina and silica, and produced under the trademark Cerafelt. This fiber is somewhat resilient and is sufficiently compressible between the sleeve 29 and the leads and cable 39 as to provide considerable resistance to the flow of air into and out of the unit 27 as the unit is heated and cooled. The lower end of the sleeve 29 is crimped around the armored cable 39 to provide a mechanical connection therebetween to prevent relative movement between the cable and sleeve 29.

*Operation*

The generator is illustrated in its assemlbed condition wherein the thermocouple unit 27 is mounted in the bracket 11 so that flames would flow from the burner head 17 tangentially over and around the upper end thereof in the event that gas is supplied thereto and ignited. As illustrated, the lower edge of the aperture 26 at the lower end thereof and the upper edge of the aperture 26 at the higher end thereof are lightly engaging the outer surface of the sleeve 29. This is a result of both the weights of the thermocouple unit as well as the force exerted between arm 24*a* downwardly against the upper end of the sleeve 29, the arm 24*a* being slightly deflected upwardly from its normal position in the position shown in the drawing. The lower arm 24*b* is also in a slightly upwardly deflected position from its normal position. To remove the thermocouple unit from the bracket, it is necessary to lift the outer free end of the arm 24*b* by either lifting entirely said end or the lifting of the arm 24*b* may be aided by pressing upwardly on the thermocouple unit against the downward bias of the arm 24*a*. By lifting the arm 24*b* to a position more nearly at a right angle to the base portion of the member 24, the sleeve 29 is freed from engagement by the periphery of the aperture 26 so that the thermocouple unit may be withdrawn from the bracket. When this is done, both the arms 24*a* and 24*b* are free to move to a position slightly lower than the positions they have in FIGURES 1 and 2 of the drawing.

To re-insert the same or a different thermocouple unit into the bracket, all that is necessary is for the operator to force the unit through the apertures 14, 26, 25 and 12. The only real resistance to such insertion is that provided by the necessary deflection of the arm 24*b*, to make the aperture 26*a* of sufficient diameter in a plane nearer a right angle to the axis of the thermocouple unit as to permit the unit to pass therethrough and the final bias exerted by the arm 24*a* as the shoulder provided by the upper end of the sleeve 29 engages the periphery of the opening 25 to deflect it slightly upward until it engages the under surface of the arm 11*c*. When this positioning takes place, the releasing of the thermocouple 29 by the operator, will cause the arm 24*b*, which has already been in engagement with the outer surface of the sleeve 29, to be moved downwardly a slight amount along with the sleeve 29 under the bias of arm 24*a* to firmly set the edge of the aperture 26 in the surface of the sleeve 29 and tightly hold the thermocouple unit in the bracket. This slight return movement and constant bias of the arm 24*a* against the upper end of the sleeve 29 prevents vibrating and rattling of the thermocouple unit in the aperture 12, which it might otherwise do except for arm 24*a*.

While I have illustrated the preferred embodiment of the invention, it is deemed to be obvious that other modifications can be made thereof without departing from the spirit of the invention. Therefore, the scope of the invention should be determined from the appended claims.

I claim:

1. In a thermoelectric generator including a mounting bracket having a mounting hole therein, a pilot burner and an elongated flame sensing unit mounted in said hole, the combination comprising holding means for said unit when said unit is mounted on said bracket, said holding means having a resilient arm extending therefrom and normally inclined at an angle to the longitudinal axis of said unit, said arm having an aperture therethrough that is large enough to slidably receive said unit, but normally grips said unit and resilient means between a portion of said bracket and a portion of said unit for biasing said unit along its longitudinal axis and in a direction to cause said arm to firmly grip said unit.

2. The combination defined in claim 1 wherein said resilient means is a leaf spring having a free end normally spaced a short distance from said bracket at a point near the hole therein and said flame sensing unit has an abutment thereon for engagement with said free end.

3. The combination defined in claim 2 wherein said flame sensing unit is thermocouple means and said resilient arm has manually engageable means thereon positioned for easy manipulation to free said unit from said holding means.

References Cited

UNITED STATES PATENTS

| | | | |
|---|---|---|---|
| 2,430,887 | 11/1947 | Ray | 136—217 X |
| 2,491,823 | 12/1949 | Maguire | 36—232 X |
| 2,526,112 | 10/1950 | Biggle | 136—220 X |
| 2,677,004 | 4/1954 | Biggle | 136—219 |
| 2,677,712 | 5/1954 | Biggle | 136—230 X |
| 2,950,888 | 8/1960 | Coltriel et al. | 248—41 |
| 2,961,479 | 11/1960 | Bertling | 174—43 |
| 3,048,216 | 8/1962 | Kile et al. | 136—217 X |

ALLEN B. CURTIS, *Primary Examiner.*